March 12, 1929. G. J. LARRABEE 1,704,980
REFRIGERATED ICE CREAM CONE SERVER
Filed Aug. 8, 1927
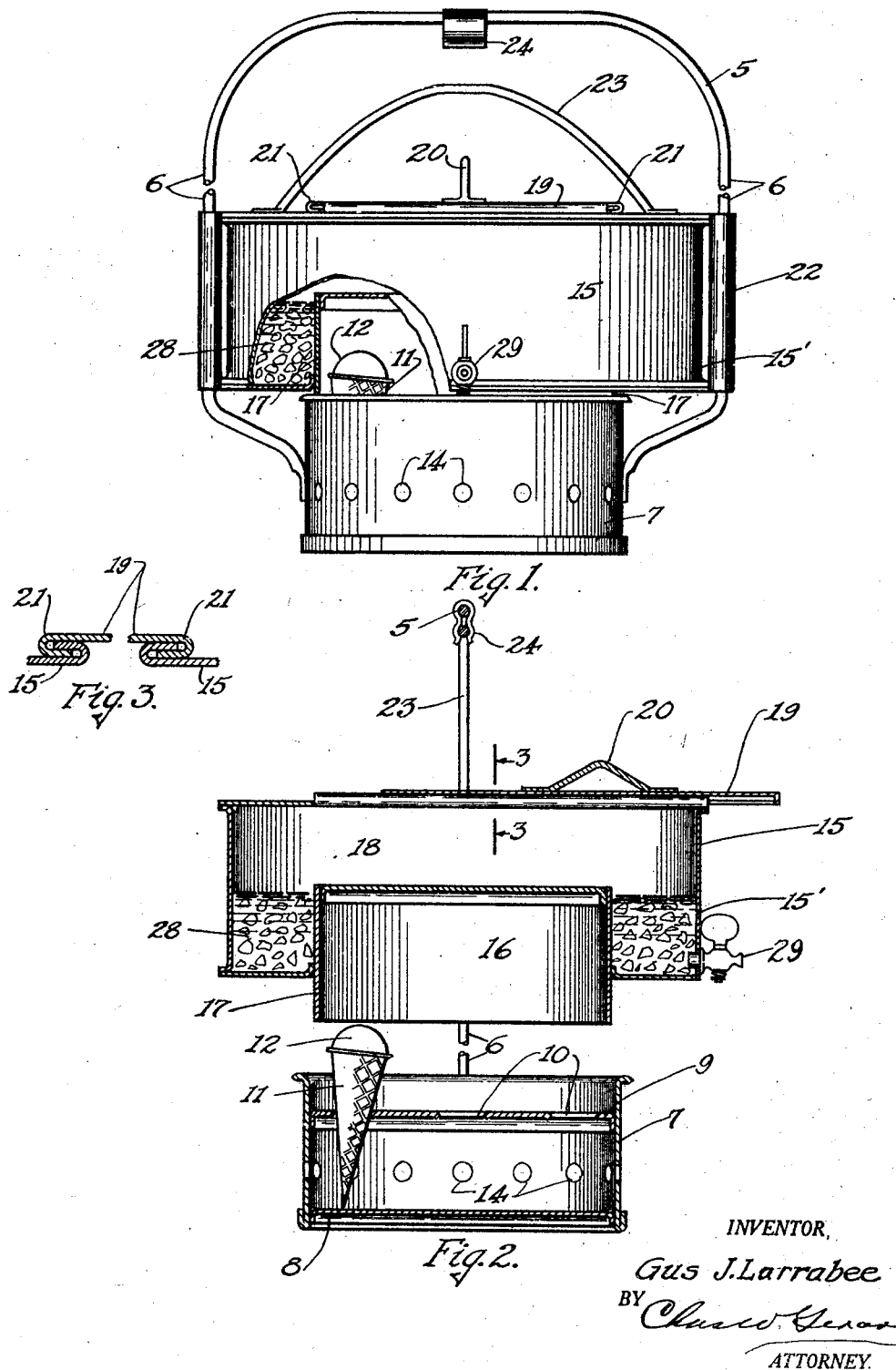
INVENTOR,
Gus J. Larrabee
BY
ATTORNEY.

Patented Mar. 12, 1929.

1,704,980

UNITED STATES PATENT OFFICE.

GUS J. LARRABEE, OF PLATTE CITY, MISSOURI, ASSIGNOR OF ONE-FOURTH TO AMON DEAL, ONE-FOURTH TO A. F. GOSSEL, AND ONE-FOURTH TO D. R. CLEVENGER, ALL OF PLATTE COUNTY, MISSOURI.

REFRIGERATED ICE-CREAM CONE SERVER.

Application filed August 8, 1927. Serial No. 211,301.

This invention relates to appliances designed more particularly for use in the serving of ice cream cones, and has for its object to provide a device of this character which is of a comparatively simple construction, and adapted for convenient use in the handling and serving of the type of confection referred to, and which will also preserve the cones in a good, merchantable and sanitary condition.

For carrying out this general purpose of the invention, I have devised an appliance which comprises a tray or holder for the cones, and also a refrigerating device adapted to enclose the cones in such a manner as to maintain a chilling or refrigerating compartment around the same and thereby preserving the congealed condition of the cream until the cones are vended.

In embodying this construction in practical form, I provide a receptacle containing the tray or cone holder, and a relatively movable hood structure adapted to enclose the space above the holder or tray and including a chamber for containing a refrigerating medium, and thus forming a chilling or refrigerating chamber occupied by the upper portions of the cones.

The invention further comprises a conveniently operated device in which the cone holding tray and the hood structure are carried by a suitable frame permitting relative movement of the parts for separation of the hood and tray to obtain convenient access to the latter in the placing and removing of the cones.

It is further sought to provide a construction comprising a minimum number of parts which will be economical to manufacture, and of a practical and durable character having nothing of a nature that is likely to get out of order.

With the foregoing general objects in view, the invention will not be described by reference to the accompanying drawing illustrating one form of construction which I have devised for fulfilling the desired objects in view, after which those features and combinations deemed to be novel will be set forth in claims.

In the drawing:—

Figure 1 is a side elevation, with parts of the frame broken away, showing a device constructed in accordance with my invention;

Figure 2 is a central vertical sectional view, also showing a portion of the frame broken away, and illustrating the tray and hood members in separated relation, and the hood member latched in its raised position; and Figure 3 is a sectional detail view, illustrating the method of mounting the slide forming the closure for the opening in the top of the hood member.

Referring now to the drawing in detail, this shows my improved appliance as comprising a suitable frame or carrying member having the top of bail portion 5 constituting the handle, and the side portions 6 of any desired length for supporting the hood and tray members which will now be described. The lower ends of the side portions 6 of the frame are bent inward, as illustrated in Figure 1, for securing the ends of the same to the sides of a suitable receptacle member 7 of hollow cylindrical form, and of any desired size according to the capacity required, and having the bottom element 8 and a tray element 9 some distance above the bottom and at a slight distance from the top margin of the receptacle, as clearly represented in Figure 2. The tray element 9 is provided with the openings 10 for receiving the ice cream cones 11, and the depth of the receptacle 7 is designed in such a way that, when the lower ends or tips of the cones 11 are supported upon the bottom element 8, the sides of the cones will rest slightly loosely within the openings 10 while the upper ends of the cones containing the ice cream dips 12 will be presented somewhat above the margin of the receptacle 7, in order to be enclosed by the refrigerating hood member about to be described. Preferably also the sides of the receptacle 7 will be formed with a plurality of air vent openings 14 between the tray and bottom element 8, in order to permit a limited circulation of air through the compartment formed within the receptacle between said tray and bottom portions.

For effecting the refrigerating or chilling action, I have devised a hood structure comprising a hollow cylindrical casing 15 formed with a bottom annular portion 15′ in order to provide the hood shape including the interior refrigerating space 16 formed by the lower central portion of the hood structure which is adapted to surround the space above the tray 9 occupied by the upper portions of the cones, as clearly illustrated in Figure 2. Preferably I provide the annular portion 15′ with the skirt extension 17 depending below the bottom of the casing and adapted to fit telescopically within the upper mouth of the casing or receptacle 8, thus producing a more closely fitting structure between the parts around the tray. The space 18 within the casing 15 forms a container for a suitable refrigerating medium, such as the usual freezing mixture 28 of crushed ice and salt, which may be placed in the space 18 through an opening in the top of the casing 15 adapted to be closed by a suitable slide member 19 having a handle portion 20 and a tongue and groove structure, as indicated at 21 in Figure 3, affording the required sliding connection between said slide 19 and the top of the casing 15. Suitable drainage may be provided for the space 18 by means of a valve 29 near the bottom of the casing 15.

In order to afford access to the space occupied by the cones 11 above the tray 9, as required for the placing and removing of the cones, I provide for appropriate relative movement of the hood structure and the receptacle 7 into separated relation by mounting the casing 15 for vertical movement along the side portions 6 of the frame, for which purpose I provide opposite sides of the casing 15 with sleeves 22 slidingly engaging the frame parts 6, as clearly represented in Figure 1. Furthermore, in order to hold the casing 15 and its hood structure in temporary raised position, as during the operation of serving the cones or renewing the supply, I provide the top of the casing 15 with a suitable bail or handle 23 which, in the raised position of the casing 15 illustrated in Figure 2, is adapted to be engaged and retained by means of a spring clip or keeper member 24 secured to the midportion of the bail or handle 5. This engagement being merely of a frictional nature, the bail 23 may be conveniently released to allow lowering of the casing 15 and the hood structure into the position shown in Figure 1, at the will of the operator.

It will thus be seen that I have devised a practical and efficient construction for carrying out the desired objects of the invention. After the space 18 within the casing 15 is supplied with the proper refrigerating medium, the space above the tray 9 may be furnished with a supply of the cones 11, and, with the hood structure in lowered position shown in Figure 1, the cones, including the ice cream dips 12, will be preserved in a perfect marketable condition, due to the low temperature which is maintained within the space 16 around the cones. The circulation of air permitted between the parts and out through the openings 14 is such that the air moving past the surfaces of the cones is kept in a dry state, the moisture of the air being deposited upon the interior surface of the hood member. Thus there are no drippings of ice cream around the cones, and the cones themselves are kept in a fresh crisp state, and not allowed to become soft, mushy or soggy as would be true of filled cones not subjected to the refrigerated condition herein provided for. It will furthermore be apparent that the appliance herein described is of an extremely simple and durable character, having nothing to get out of order, and which may be kept in a sanitary condition, in addition to preserving the cones to be vended in a clean, sanitary state.

While I have illustrated and described what I now regard as the preferred form of construction for embodying the proposed improvements, I desire to reserve the right to make all such changes and modifications as may fairly fall within the scope of the appended claims.

Having thus described my invention, what I claim and desire to secure by Letters Patent is:—

1. An ice cream cone serving and refrigerating device comprising a frame carrying a receptacle provided with a cone-carrying tray, and a refrigerating hood also carried by said frame and slidable thereon into and out of overhanging relation to the tray portion of said receptacle.

2. An ice cream cone serving and refrigerating device comprising a frame carrying a receptacle provided with a cone-carrying tray, a refrigerating hood also carried by said frame and slidable thereon into and out of overhanging relation to the tray portion of said receptacle, and means for latching said hood in raised position.

3. An ice cream cone serving and refrigerating device comprising a frame carrying a receptacle provided with a cone-carrying tray, and a hollow hood-shaped casing providing a chamber for a refrigerating medium and adapted to enclose the cones on said tray and cooperate with the tray to form a refrigerating compartment for the upper portions of the cones, said casing and receptacle having sliding connections permitting relative vertical movement of said casing and receptacle into separated relation.

4. An ice cream cone serving and refrigerating device comprising a frame carrying a receptacle provided with a cone-carrying tray, and a hollow casing supported on said receptacle and providing a chamber for a refrigerating medium, said casing having a lower annular portion surroundinng the space above said tray and forming a refrigerating compartment for the upper portions of the cones.

5. An ice cream cone serving and refrigerating device comprising a frame carrying a receptacle provided with a cone-carrying tray, a hood member including a refrigerating chamber surrounding the space above said tray, said hood and receptacle being relatively movable into separated relation, and an annular extension carried by said hood member in telescoping relation to said receptacle.

6. An ice cream cone serving and refrigerating device comprising a receptacle having a bottom and a cone-carrying tray above the bottom, the sides of the receptacle having ventilating openings for the space between said tray and bottom, and a refrigerating hood surrounding the space above said tray.

In witness whereof I hereunto affix my signature.

GUS J. LARRABEE.